July 8, 1924.  
S. C. TUCKER  
CLAMP  
Filed Jan. 2, 1924
1,500,907
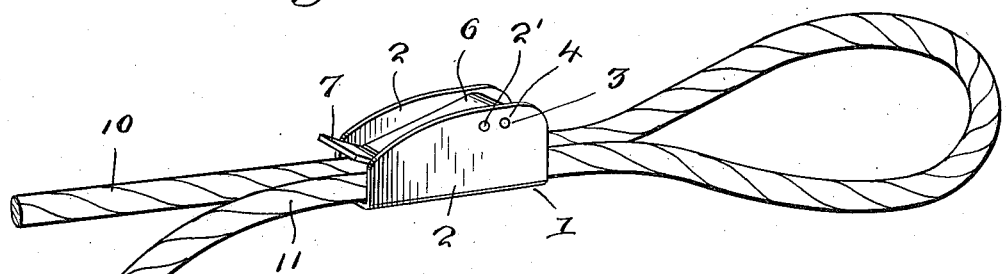
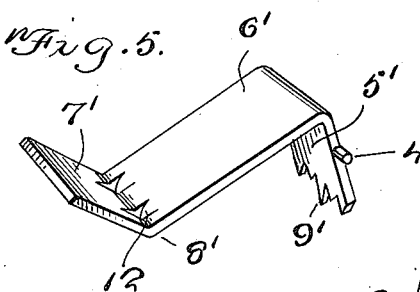
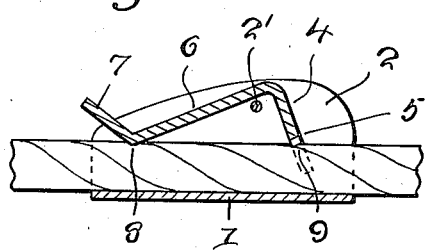
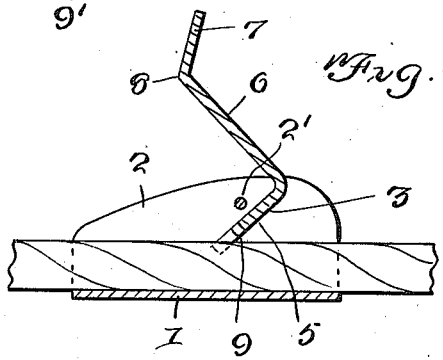
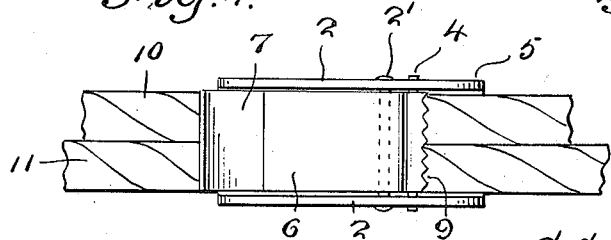
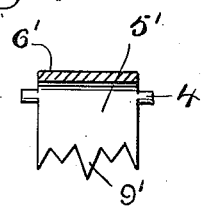
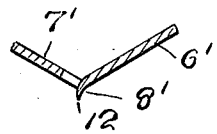
S. C. Tucker  
INVENTOR  
BY Victor J. Evans  
ATTORNEY
WITNESS:  
E. R. Ruppert.

Patented July 8, 1924.

1,500,907

UNITED STATES PATENT OFFICE.

STEPHEN C. TUCKER, OF ATLANTA, GEORGIA, ASSIGNOR OF ONE-THIRD TO GEORGE W. FARMER, OF ATLANTA, GEORGIA.

CLAMP.

Application filed January 2, 1924. Serial No. 684,008.

*To all whom it may concern:*

Be it known that I, STEPHEN C. TUCKER, a citizen of the United States, residing at Atlanta, in the county of Fulton and State of Georgia, have invented new and useful Improvements in Clamps, of which the following is a specification.

The object of this invention is the production of a clamp employed for adjusting the length of a rope in which the construction is simple and may be cheaply manufactured, and in which the rope is gripped in such a manner as to prevent its accidental movement through the clamp.

The drawing, which accompanies and which forms part of this application, illustrates a satisfactory embodiment of the improvement reduced to practice, and wherein:—

Figure 1 is a perspective view showing the clamp in operative position.

Figure 2 is an approximately central vertical longitudinal sectional view through the clamp.

Figure 3 is a substantially similar view but showing the jaw of the clamp swung to inoperative position.

Figure 4 is a top plan view of the improvement, as illustrated in Figure 1.

Figure 5 is a perspective view of a modified form of jaw.

Figure 6 is a transverse and Figure 7 is a longitudinal section therethrough.

My improvement will be found especially useful for adjusting rope or lines on the draft animal of a plow or other agricultural implement, as the farmer can retain each of his hands on the plow and still guide the animal, and the line or rope can be adjusted when the animal is changed from one implement to the other. The improvement is, of course, not to be restricted to this particular use but may be successfully employed in various other connections.

Referring now to the drawing in detail, it will be noted that the body of the clamp is in the nature of a substantially U-shaped member, the same having a flat bottom 1 and parallel sides 2. The upper edges of the sides are preferably curved upwardly from one to the opposite end thereof, and passing through and bracing the sides there is a pin or rivet 2'. In a line with the rivet the sides are provided with aligning round openings 3 that receive therein trunnions 4 formed on one of the angle ends 5 of what I will term the jaw member of the improvement. The jaw merges into the angle body portion 6 of the jaw, and the body merges into an upwardly inclined handle portion 7. By reference to the drawing, it is to be noted that the inner wall at the juncture of the body and handle is pointed, as at 8, and also that the jaw 5 has its outer edge provided with teeth 9. A rope 10 is passed through the body of the clamp below the jaw, when the latter is in the position illustrated in Figure 3, the said rope being looped, and the second strand thereof is also passed through the body. For distinction the second strand is indicated by the numeral 11 and is arranged in the clamp alongside the strand 10. The clamping jaw is then swung from the position illustrated in Figure 3 to the positions illustrated in Figures 1, 2 and 4. The teeth 9 of the jaw 5 will be forced into the strands 10 and 11, and the sharpened edge 8 will also enter the said strands. Thus the strands are engaged at two opposite and distinct points so that free or accidental movement of either strand of the rope through the clamp will be positively prevented. The rope may be easily adjusted by swinging the jaw to inoperative position.

In Figures 5 and 6 of the drawing, I have illustrated a slight modification, in which the pointed end 8' at the juncture of the body 6' and handle portion 7' is formed with V-shaped slits and the metal bounded by these slits is bent outwardly to form prongs 12. These prongs, in addition to the teeth on the jaw 5' will enter the strands of the rope to effect in sustaining the rope against movement through the clamp.

Also in these figures, the central tooth 9' on the jaw 5' is of a materially greater length than the remaining teeth. This increases the holding ability of the jaw as the long tooth pierces the strands of the rope and forces the divided strands to the opposite sides of the said tooth and bunch said strands for engagement with the remaining teeth of the jaw.

Having described the invention, I claim:—

A rope clamp, as herein described, comprising a U-shaped body, a toothed jaw having trunnions journaled in the sides of the body, said jaw merging into an angle extension that in turn merges into an outward angle portion providing a handle, and the juncture between the last mentioned portions being sharpened and formed with teeth, for the purpose set forth.

In testimony whereof I affix my signature.

STEPHEN C. TUCKER.